Nov. 4, 1941.　　　W. BLAIR　　　2,261,134
TOOL DEVICE
Filed July 31, 1939　　　2 Sheets-Sheet 1
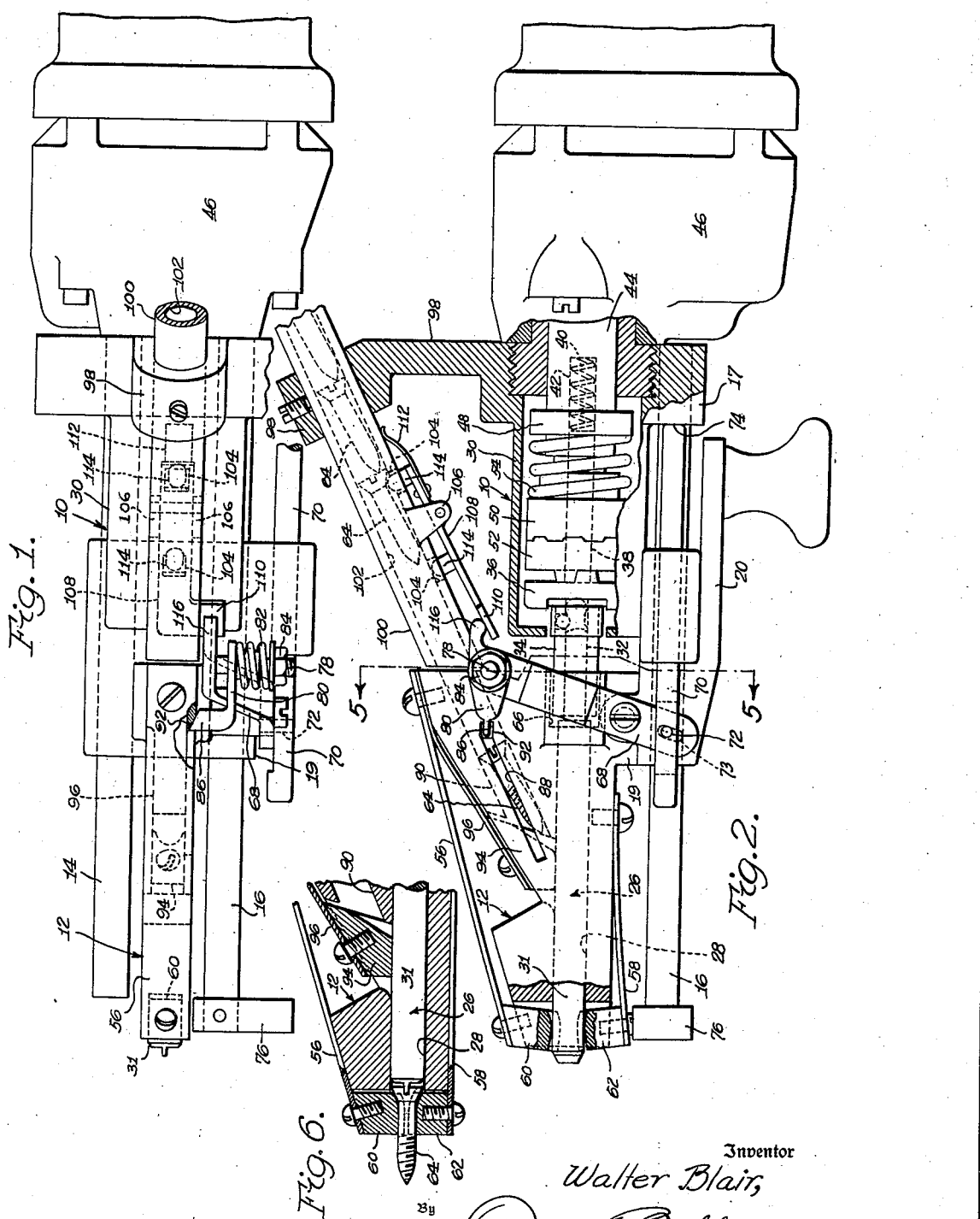
Inventor
Walter Blair,
By
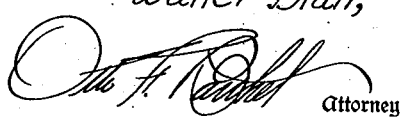
Attorney

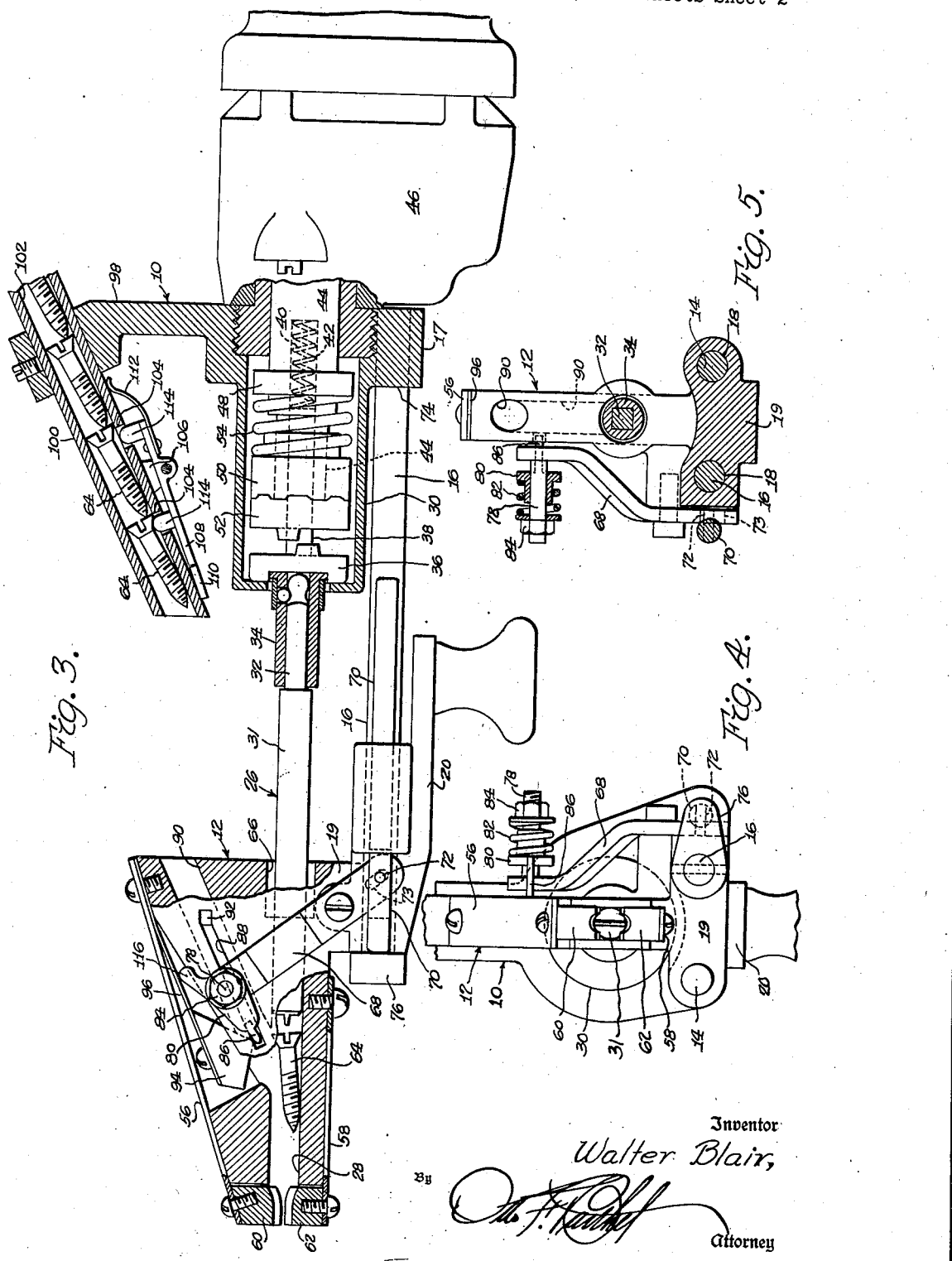

Patented Nov. 4, 1941

2,261,134

UNITED STATES PATENT OFFICE 2,261,134

TOOL DEVICE

Walter Blair, Detroit, Mich.

Application July 31, 1939, Serial No. 287,454

16 Claims. (Cl. 10—162)

This invention relates, in general, to tools and, in particular, to a new and improved screw driver of the automatic type.

One of the objects of this invention is to provide a new and improved screw driver which is charged and driven automatically and which is easily and faultlessly operable.

Another object is to provide a new and improved automatic screw driver which, after the initial positioning of its parts for proper operation, will operate over long perods of time without need for further adjustment regardless of the output required thereof.

Another object herein is to provide a new and improved arrangement of the parts or elements of an automatic screw driver whereby the operation is more efficient than heretofore and the results therefrom of an improved nature.

Another object is to provide a new and improved screw driver which is automatic in its feeding or charging operations and in its driving operations and wherein said operations are so inter-dependent and so inter-related as to eliminate any possibility of jamming or otherwise disabling the device.

Another object is to lower the material and assembly costs of, minimize repair and adjustment needs for, improve the co-relation of the parts of, facilitate the operation of and thereby reduce the degree of technical or mechanical knowledge required therefor, and improve the utility and efficiency of, an automatic screw driver.

Other objects and advantages of the invention will become readily apparent from a reference to the following specification taken in conjunction with the accompanying drawings of which there are two (2) sheets and wherein:

Figure 1 is a plan view of the screw driver and showing the position of its parts at the end of a screw driving operation, same being partly broken away and in section to illustrate more clearly some of the details of construction;

Fig. 2 is a vertical view of the showing in Fig. 1, same also being partly broken away and in section for the same reasons as above;

Fig. 3 is a view similar to Fig. 2 but showing the parts of the screw driver in a different position, a position whereat the screw and driver are ready for inter-engagement and ejection from the barrel enclosing them;

Fig. 4 is an elevational view of the working end of the screw driver in the position thereof as shown in Fig. 2;

Fig. 5 is a section taken along the lines 5—5 in Fig. 2; and

Fig. 6 is a detailed section of the working end of the screw driver and showing the relative position of the parts thereof as they appear in a position intermediate the two positions shown in Figs. 3 and 2.

The portable, automatic screw driver shown in the figures comprises, in part, a pair of casings, generally indicated at 10 and 12 and selectively movable relatively to each other for adapting the tool for activity or inactivity, casing 10 serving to provide, among other things, supports for the prime mover and magazine, and casing 12 serving to provide, among other things, a barrel for the screws and screw driver and a support for the feed mechanism. To allow for the above mentioned relative movability of the casings 10 and 12, there is provided a pair of elongated guide rods 14 and 16, said rods being stationarily anchored at one end of each thereof to a lower portion 17 of the casing 10 and extending forwardly in spaced parallelism therefrom through a pair of guide bores 18 provided therefor in a lower portion 19 of the casing 12 located at the rear of the latter, whereby and wherealong said casings are selectively movable toward and from one another. This movability of the casings 10 and 12 is selectively effectuated by means of a handle member 20 which is fixed to or formed integrally with the under-side of the portion 19 of said casing 12 and preferably extends rearwardly therefrom for a substantial distance in order to provide easy accessibility thereto in any relative positioning of said casings.

A screw driver element, generally indicated at 26, is provided and is adapted for being supported simultaneously by both of the casings 10 and 12, the forward or driving end of said element being carried within a barrel or bore 28 formed in and through said casing 12, and the rearward or driven end of said element being carried within a clutch housing 30 secured to or formed integrally with said casing 10. The element 26 may be an integral unit or it may, for reasons of replacements and assembly of parts, be comprised of separate units, as shown, but, at any rate, said element includes an elongated screw-driving head member 31 extending into the barrel 28, a length 32 of polygonal cross section preferably integral with said member 31 or at least being movable rotatably and longitudinally therewith, a sleeve 34 of internal cross section complementary to said polygonal cross section of said length 32 for rotating with said member 31 and said length 32 and being preferably adapted in any well known manner for longitudinal movement therewith, a jaw clutch member 36 integral with or fixed to the rear end of said sleeve 34 or at least being rotatably and longitudinally movable therewith and arranged within the housing 30 with its jaw clutch face facing the opposite side of said housing, and a shaft 38 fixed to or integral with said clutch member 36 or at least being operable for rotatable and longitudinal movements therewith and extending therefrom longitudinally through said housing.

The end of the screw driver element 26 opposite the driving end thereof, that is, the shaft 38, extends into abutting relationship with a spring 40 housed within an axial bore 42 of the drive shaft 44 of a prime mover, such as a motor 46, said prime mover being supported in any well known manner on and by the casing 10 so that said drive shaft may receive said other shaft in the manner described. It goes without saying, then, that the spring 40 urges unitary, longitudinal movement of the members 38, 36, 34, 32 and 31 of the screw driver element 26 forwardly, that is, in the direction of the casing 12, and it is pointed out that such movement is limited by means such as the engagement of the forward face of the clutch member 36 and the inner face of the forward wall of the housing 30, as shown in Fig. 3 and as compared with Fig. 2.

The structure for selectively rotating the screw driver element 26 may be any one of several forms or combinations thereof, so that the one shown and herebelow described is simply illustrative and, therefore, replaceable at will. The end of the drive shaft 44, which is tubular because of the bore 42 which receives the spring 40 and shaft 38, is provided with a collar 48, a slip clutch unit 50—52 of any well known construction and design, and a spring 54 arranged between said collar and said clutch unit. The collar 48 may be rotatable with the shaft 44 or it may be nonrotatable, but, at least, it has no axial movement relatively thereto. The slip clutch unit 50–52 has one of its elements, 50, rotatable with the shaft 44 and connected thereto for movement therealong and the other of its elements, 52, mounted on said shaft freely as far as rotation therewith is concerned but being prevented in any well known manner from axial movement therealong, said element 52, in addition to comprising one of the two elements of the slip clutch 50—52, also comprises one of the two elements of a jaw clutch 36—52. It will be understood that longitudinal movement of the screw driver element 26 in the direction of and relatively to the casing 10 (by means which will be presently described) engages the jaw clutch unit 36—52 against the force of the spring 40 and causes said element to be rotatably driven thereupon, and it will be seen that, in the event of an excessive or abnormal load on said element, the member 52 of the slip clutch unit 50—52 will slip relatively to the member 50 of said latter unit and thereby avoid damage to the device, said member 50 opposing the spring 54 to permit such slippage.

Before describing the means by which the screws are charged or fed into the barrel 28 ahead of the screw driver element 26, the means by which the aforementioned longitudinal movement of said element in the direction of and relatively to the casing 10 will be herewith described. On the upper and lower walls of the casing 12 there is arranged a pair of leaf springs 56 and 58, said springs being anchored at their rear ends to portions of said walls substantially spaced from the front end of said casing and extending over said front end whereat said springs have secured thereto opposed jaws 60 and 62. In the normal positions of the springs 56 and 58, the jaws 60 and 62 lie on opposite sides of the central axis of the barrel 28 and equally spaced therefrom immediately adjacent the end thereof, said jaws defining a passageway coaxially aligned with said central axis and having a cross sectional area adapted to receive and align the stem of said screw but to oppose the extrusion therethrough of the screw head. The axial length of the jaws 60 and 62 is preferably less than the length of the screw stem so that, before complete extrusion of the screw from the passageway formed by said jaws, the jaws may aid in aligning the outer end of the screw with the work into which it is to be driven. Assuming that a screw 64 is in the barrel 28 between the outer end thereof and the driving end member 31 of the element 26 (which is the condition, as in Fig. 3, when the casings 10 and 12 are fully separated), a pull on the handle 20 until the space between said casings is reduced to an extent whereat the actual end of said member 31 has driven the screw stem between and through the jaws 60 and 62 and the screw head into abutment with said jaws (as is the condition in Fig. 6) will not cause longitudinal movement of said element 26 in the direction of and relatively to the casing 10 to engage the jaw clutch 36—52. But, as soon as the member 31 is subjected to the pressure caused by the opposition of the resiliently supported jaws 60 and 62 while passing the screw head therethrough by an increased pull on the handle 20, the element 26 will be forced backwardly so as to engage the jaw clutch 36—52 whereupon, if the prime mover 46 is then operating or caused to be operated, said element 26 will be rotated. Though means for selectively controlling the operation and inoperation of the prime mover 46 have not been shown, it is to be presumed that such means are provided and are of any conventional type.

It may be desirable to rely entirely upon the pressure caused by the spring impressed jaws 60 and 62 and the resulting opposition to the extrusion of the screw 64 from the passage formed thereby to inter-engage the jaw clutch members 36 and 52, or it may be desirable to supplement the effectiveness thereof by providing other means, such means possibly taking the form of an abutting engagement between the end of the sleeve 34 and the forward wall of an enlargement 66 provided in the casing 12 at the rear end of the barrel 28 and effective upon the bringing together of the casings 10 and 12. It will be noted, however, that Fig. 2 does not show such an abutting relationship because it has been found that the effectiveness of the spring impressed jaws 60 and 62 is sufficient for the results desired.

To a side of, preferably, the lower portion 19 of the casing 12 there is pivotally mounted, intermediate its ends and for movement about a transverse axis, a lever 68 the lower end of which is connected to a driver therefor, such as a rod 70 which is carried by and movable with said casing and extends longitudinally for a substantial distance in either direction from said lever. The connection between the lever 68 and its driver 70 may be rigid, but it has been found preferable to provide a pin and slot connection 72—73 therebetween so that said driver may remain at a constant level during the swinging thereby of said lever, this provision simplifying the construction of the device and enabling the casing 10 to serve as a stop, such as at 74, for the rear end of said driver and a lug 76 carried on the adjacent guide rod 16 to serve as a stop for the forward end of said driver. If the relationship of the casings 10 and 12 is changed from that shown in Fig. 2 to that shown in Fig. 3, just prior to the completion of the change the driver 70 will engage the stop 76 and the balance of the relative movement of said casings will effectuate the swinging of the lever 68 from that position thereof shown in Fig. 2 into that position thereof shown in Fig. 3. On the other hand, if the relationship of the casings 10 and 12 is changed from that position shown in Fig. 3 to that position shown in Fig. 2, just prior to the completion of the change the driver 70 will engage the stop 74 and the balance of the relative movement of said casings will effectuate the swinging of the lever 68 from that position thereof shown in Fig. 3 into that position thereof shown in Fig. 2.

The free end of the lever 68, while attaining one of its limit positions, serves to introduce one of the screws 64 into the barrel 28 ahead of the screw driver element 26 and, while attaining the other of its limit positions, serves to release another screw from the magazine (to be described) for subsequent discharge into said barrel. To accomplish the first of these purposes the lever 68, at its free end, carries a pin 78 about which is pivotally mounted an arm 80, said arm preferably having a substantial axial bearing on said pin for maintaining the coincidence of the axis of said pin and the pivotal axis of said arm, and a spring 82 is arranged about said pin between said arm and a head 84 for said pin for constantly urging said arm along said pin away from said head and toward the casing 12. The arm 80 is provided with a driving element 86 which extends laterally therefrom in the direction of the casing 12 and is received within an inclined slot 88 formed in the side wall of said casing. The slot 88 is in communication with and extends in the direction of an inclined chute or bore 90 provided in the casing 12, said chute or bore being open at its rearward end and in communication at its forward end with the barrel 28. Naturally, the pivotal connection between the lever 68 and the arm 80 permits the element 86 to follow the slot 88 during the pivotal movement of said lever, and the spring 82 constantly holds said element in its innermost position with respect to said slot. The forward and lower end of the slot 88 may by itself provide a stop for the forward travel of the element 86 (upon the separation of the casings 10 and 12), or there may be provided, as shown in Fig. 3, a slight spacing between said forward and lower end and said element so that means, such as an abutting engagement between the lug 76 and the lower portion 19 of the casing 12, would have to be relied upon to determine the actual distance the casings 10 and 12 may be moved apart. The wall of the casing 12 in which the slot 88 is formed is provided with a short, inclined track 92 which merges into said slot at the rearward and upper end of the latter and provides means upon which the element 86 may reside so as to be outside the chute or bore 90 when the casings 10 and 12 are positioned as in Fig. 2. Any means may be provided whereby the retractive movement of the casing 12 is limited to that shown in Fig. 2 so that the element 86 will not be drawn rearwardly past the end of the track 92, but it has been found simplest to permit an abutment between the casing 12 and the magazine (to be described) to perform this function.

It will be seen, then, that forward movement of the arm 80 from the position shown in Fig. 2 to the position shown in Fig. 3 causes the element 86 to force the screw 64 directly thereahead and residing in the chute 90 into the barrel 28, and that rearward movement of said arm from the position shown in Fig. 3 to the position shown in Fig. 2 repositions said element upon the track 92 for permitting the passage therepast of another screw.

For opposing free passage of that screw which is in the chute 90 and ahead of the element 86 into the barrel 28, there is provided a stop member 94 which is normally carried over the forward end of said chute on the free end of a leaf spring 96 anchored to the casing 12 below the spring 56. When the casings 10 and 12 are being separated and the forward end of the driver 70 engages the stop 76, the lever 68 is swung about its pivot and the arm 80 is driven forwardly, the element 86 driving the screw 64 thereahead and in the chute 90 in opposition to and past the member 94 into the barrel 28. When the casings 10 and 12 are then brought together to drive home the above mentioned screw, the engagement of the driver 70 and the stop 74 swings the lever 68 back until the element 86 is upon the track 92, prior to which the spring 96 returns the member 94 into position for closing off the forward end of the chute 90 and preventing the next screw from passing thereby.

The casing 10 has secured thereto or formed integrally therewith a magazine support 98 which extends above the clutch housing 30 and adjustably carries a magazine 100 having an elongated bore 102 in which is stored a plurality of the screws 64, said magazine extending forwardly from said support to substantially a position of abutment with the rear of the casing 12 when said casings are in the position shown in Fig. 2, and the axis of said bore having an angle of inclination substantially equal to that of the chute or bore 90 and being aligned therewith when said casings are in said position so that said bores will form a substantially continuous passageway for said screws to pass from said bore 102 into said bore 90. The wall of the magazine 100 is formed with a pair of longitudinally spaced apertures 104, and to said wall between said apertures there is provided a pair of brackets 106. A lever 108 is pivotally connected, intermediate its ends, to and between the brackets 106, said lever extending in the direction of the length of the magazine 100 and being provided at its forward end with a laterally extending arm 110 and at its rearward end with a rearwardly extending leaf spring 112, said spring at its free end engaging the adjacent wall of said magazine to urge the forward end of said lever toward said magazine and the rearward end away therefrom. On either side of the pivotal axis of the lever 108, on the side adjacent the magazine 100, there is carried by the former a stop pin 114 and said pins are spaced similarly as the apertures 104 for being alternately introduced thereinto upon the oscillation of said lever by and against the force of the spring 112.

The longitudinal spacing between the apertures 104 in the magazine 100 is substantially equal to the length of one of the screws 64 so that, when the lever 108 is in its normal position, such as is shown in Fig. 3, the two stop pins 114 will directly underlie the heads of the two forwardmost screws in the bore 102. Furthermore, the length of each of the stop pins 114 is such that, when the lever 108 is shown in the position thereof in Fig. 3, the forward stop pin 114 will be in projected position through its aperture 104 up against the forward face of the head of the first screw in the bore 102, and the rearward stop pin 114 will be projected into its aperture 104 but will be residing externally of said bore and directly below the head of the next screw in line. Therefore, movement of the lever 108 in a direction opposed to the spring 112 will draw the forward pin 114 from the screw 64 being held thereby and permit it by gravity to pass along the bore 102, and simultaneously the rearward pin 114 will be projected into said bore up against the forward face of the screw head thereabove to prevent its downward movement along said bore until said lever is restored to its normal position.

The means for moving the lever 108 in opposition to the spring 112 comprises an arm 116 which is secured to or formed integrally with the upper end of the lever 68 and extends rearwardly therefrom to engage the lever arm 110 and actuate the lever 108 upon or slightly before the positioning of the casings 10 and 12 as they are shown in Fig. 2.

When the casing 12 is moved forwardly from the position thereof shown in Fig. 2, the arm 116 is drawn off the arm 110 and the spring 112 forces the forward end of the lever 108 upwardly toward the magazine 100, the rearward pin 114 being withdrawn from the bore 102 to release the screw 64 being held thereby and the forward pin 114 being projected into said bore to catch said screw, the remaining screws in said bore following said screw downwardly. Then, when and after the rod 70 engages the stop 76, the driving element 86 leaves the cam or track 92, enters the bore 90 through the slot 88, pushes the screw 64 thereahead against the stop member 94, and causes the latter to raise and permit said screw to fall into the barrel 28 ahead of the driving end 31 of the screw driver element 26, said barrel having been cleared for said screw simply by the protraction of the casing 12 relatively to said screw driver element. It is upon the engagement of the rod 70 and stop 76, or slightly thereafter, that the clutch 36—52, 50 is disengaged.

In order to drive the screw 64 into the work and now residing in the barrel 28, the casing 12 is moved rearwardly toward the casing 10, an early phase of this movement causing said screw to be positioned by the screw driver element 26 as is shown in Fig. 6. The position of the elements shown in Fig. 6 is reached before the rod 70 strikes the stop 74 and is characteristic of the beginning of the engagement of the clutch 36—52, 50. Further rearward movement of the casing 12 with respect to the casing 10 causes the then rotating element 26 to push the screw 64 (which is residing in the barrel 28 between the spring impressed jaws 60 and 62) past said jaws and drive said screw home into the work. Simultaneously, the driving element 86 travels backwardly along the slot 88 and locates itself on the cam or track 92, the arm 116 reengaging the arm 110 and depressing the lever 108, and the screw 64 which is then being held in the bore 102 by the forward pin 114 being released to travel from the bore 102, into the bore 90, past the element 86, and up against the stop 94. Thereafter, the cycle is repeated.

Although the invention has been described with some detail it is not intended that such description is to be definitive of the limits of the inventive idea. The right is reserved to make such changes in the details of construction and arrangement of parts as will fall within the purview of the attached claims.

What I claim is:

1. In a portable tool device, a head member having a barrel therethrough and a bore inclined to said barrel and in communication therewith, a supporting member for said head member and having an elongated storage chamber inclined similarly as said bore, an elongated implement carried by said barrel and said supporting member, said members being movable relatively to each other and to said implement into a limit position whereat said implement is in a retracted position within said barrel and said bore and said chamber are in a position of spaced parallelism, said members also being movable relatively to each other and to said implement into another limit position whereat said implement is in a position protracted from said barrel and said bore and said chamber are in a position of adjacency and alignment, a lever pivotally carried by said head member, said lever having an element extending laterally into said bore and being movable therealong with said lever, driving means for said lever to position said element adjacent the lower end of said bore when said members are at said first limit position therefor and to position said element adjacent the upper end of said bore when said members are at said second limit position therefor, and means operable when said members are at one of said positions for moving said element laterally outwardly from the path of a fastener means traversable through said bore.

2. In a portable tool device, a head member having a barrel therethrough and a bore inclined to said barrel and in communication therewith, a supporting member for said head member and having an elongated storage chamber inclined similarly as said bore, an elongated implement carried by said barrel and said supporting member, said members being movable relatively to each other and to said implement into a limit position whereat said implement is in a retracted position within said barrel and said bore and said chamber are in a position of spaced parallelism, said members also being movable relatively to each other and to said implement into another limit position whereat said implement is in a position protracted from said barrel and said bore and said chamber are in a position of adjacency and alignment, a lever pivotally carried by said head member, said lever having an element extending laterally into said bore and being movable therealong with said lever, driving means for said lever to position said element adjacent the lower end of said bore when said members are at said first limit position therefor and to position said element adjacent the upper end of said bore when said members are at said second limit position therefor, means operable when said members are at one of said positions for moving said element laterally outwardly from the path of a fastener means traversable through said bore, and a second lever pivotally carried by said supporting member and having an element laterally and alternately extensible into and out of said chamber, said first lever actuating said second lever to move said second element out of said chamber when said members arrive at said second limit position and to permit the return of said second element into said chamber when said members leave said second limit position.

3. In a portable tool device, a head member having a barrel therethrough and a bore inclined to said barrel and in communication therewith, a supporting member for said head member and having an elongated storage chamber inclined similarly as said bore, an elongated implement carried by said barrel and said supporting member, said members being movable relatively to each other and to said implement into a limit position whereat said implement is in a retracted position within said barrel and said bore and said chamber are in a position of spaced parallelism, said members also being movable relatively to each other and to said implement into another limit position whereat said implement is in a position protracted from said barrel and said bore and said chamber are in a position of adjacency and alignment, a lever pivotally carried by said head member, said lever having an element extending laterally into said bore and being movable therealong with said lever, driving means for said lever to position said element adjacent the lower end of said bore when said members are at said first limit position therefor and to position said element adjacent the upper end of said bore when said members are at said second limit position therefor, means operable when said members are at one of said positions for moving said element laterally outwardly from the path of a fastener means traversable through said bore, a second lever pivotally carried by said supporting member and having an element laterally and alternately extensible into and out of said chamber, said first lever actuating said second lever to move said second element out of said chamber when said members arrive at said second limit position and to permit the return of said second element into said chamber when said members leave said second limit position, and a spring for positively returning said second element into said chamber.

4. In a portable tool device, a head member having a barrel therethrough and a bore inclined to said barrel and in communication therewith, a supporting member for said head member and having an elongated storage chamber inclined similarly as said bore, an elongated implement carried by said barrel and said supporting member, said members being movable relatively to each other and to said implement into a limit position whereat said implement is in a retracted position within said barrel and said bore and said chamber are in a position of spaced parallelism, said members also being movable relatively to each other and to said implement into another limit position whereat said implement is in a position protracted from said barrel and said bore and said chamber are in a position of adjacency and alignment, a lever pivotally carried by said head member, said lever having an element extending laterally into said bore and being movable therealong with said lever, driving means for said lever to position said element adjacent the lower end of said bore when said members are at said first limit position therefor and to position said element adjacent the upper end of said bore when said members are at said second limit position therefor, means operable when said members are at one of said positions for moving said element laterally outwardly from the path of a fastener means traversable through said bore, and a second lever pivotally carried intermediate its ends by said supporting member and having a pair of elements arranged thereon forwardly and rearwardly of its pivotal axis, said elements of said pair being laterally and alternately extensible into said chamber and laterally and alternately extensible out of said chamber upon the actuation of said second lever, said first lever actuating said second lever to move said forward element out of said chamber and said rearward element into said chamber when said members arrive at said second limit position and to permit the movements of said rearward element out of said chamber and of said forward element into said chamber when said members leave said second limit position.

5. In a portable tool device, a head member having a barrel therethrough and a bore inclined to said barrel and in communication therewith, a supporting member for said head member and having an elongated storage chamber inclined similarly as said bore, an elongated implement carried by said barrel and said supporting member, said members being movable relatively to each other and to said implement into a limit position whereat said implement is in a retracted position within said barrel and said bore and said chamber are in a position of spaced parallelism, said members also being movable relatively to each other and to said implement into another limit position whereat said implement is in a position protracted from said barrel and said bore and said chamber are in a position of adjacency and alignment, a lever pivotally carried by said head member, said lever having an element extending laterally into said bore and being movable therealong with said lever, driving means for said lever to position said element adjacent the lower end of said bore when said members are at said first limit position therefor and to position said element adjacent the upper end of said bore when said members are at said second limit position therefor, means operable when said members are at one of said positions for moving said element laterally outwardly from the path of a fastener means traversable through said bore, a second lever pivotally carried intermediate its ends by said supporting member and having a pair of elements arranged thereon forwardly and rearwardly of its pivotal axis, said elements of said pair being laterally and alternately extensible into said chamber and laterally and alternately extensible out of said chamber upon the actuation of said second lever, said first lever actuating said second lever to move said forward element out of said chamber and said rearward element into said chamber when said members arrive at said second limit position and to permit the movements of said rearward element out of said chamber and of said forward element into said chamber when said members leave said second limit position, and a spring for normally urging said forward element into said chamber and said rearward element out of said chamber.

6. In a portable tool device, a head member having a barrel therethrough and a bore inclined to said barrel and in communication therewith, a supporting member for said head member and having an elongated storage chamber inclined similarly as said bore, an elongated implement carried by said barrel and said supporting member, said members being movable relatively to each other and to said implement into a limit position whereat said implement is in a retracted position within said barrel and said bore and said chamber are in a position of spaced parallelism, said members also being movable relatively to each other and to said implement into another limit position whereat said implement is in a position protracted from said barrel and said bore and said chamber are in a position of adjacency and alignment, a lever pivotally carried by said head member, said lever having an element extending laterally into said bore and being movable therealong with said lever, a cam externally of said bore, and driving means for said lever to position said element adjacent the lower end of said bore when said members are at said first limit position therefor and to position said element adjacent the upper end of said bore and engage same with said cam when said members are at said second limit position therefor, said cam being operable when said members are in one of said positions for urging said element laterally outwardly from the path of a fastener means traversable through said bore.

7. In a portable tool device, a head member having a barrel therethrough and a bore inclined to said barrel and in communication therewith, a supporting member for said head member and having an elongated storage chamber inclined similarly as said bore, an elongated implement carried by said barrel and said supporting member, said members being movable relatively to each other and to said implement into a limit position whereat said implement is in a retracted position within said barrel and said bore and said chamber are in a position of spaced parallelism, said members also being movable relatively to each other and to said implement into another limit position whereat said implement is in a position protracted from said barrel and said bore and said chamber are in a position of adjacency and alignment, a lever pivotally carried by said head member, said lever having an element extending laterally into said bore and being movable therealong with said lever, a cam externally formed on said head member adjacent the upper end of said bore, driving means for said lever to position said element adjacent the lower end of said bore when said members are at said first limit position therefor and to cause engagement between said element and said cam to position said element externally of and adjacent said upper end of said bore when said members are at said second limit position therefor, and a second lever pivotally carried by said supporting member and having an element laterally and alternately extensible into and out of said chamber, said first lever actuating said second lever to move said second element out of said chamber when said members arrive at said second limit position and to permit the return of said second element into said chamber when said members leave said second limit position.

8. In a tool device, a casing formed with a pair of intercommunicated passageways, one of said passageways being operable for supporting a tool for rectilinear movement relatively thereto between a pair of limit positions, the other of said passageways being operable for supporting an attachment means, stop means normally extending into said other passageway for opposing movement of the attachment means therepast, and feeder means operable responsive to relative movement of said casing and tool from one of said positions to the other independently of said stop means for ineffectuating the latter and forcing the attachment means therepast.

9. In a tool device, a casing formed with a pair of intercommunicated passageways, one of said passageways being operable for supporting a tool for rectilinear movement relatively thereto between a pair of limit positions, the other of said passageways being operable for supporting an attachment means, resiliently supported stop means normally extending into said other passageway ahead of the attachment means therein for opposing movement of the latter therepast from said other passageway into said one passageway, and feeder means operable responsive to relative movement of said casing and tool from one of said positions to the other independently of said stop means for overcoming the resiliency of the latter and forcing the attachment means therepast.

10. In a tool device, a casing formed with a pair of intercommunicated passageways, one of said passageways being operable for supporting a tool for rectilinear movement relatively thereto between a pair of limit positions, the other of said passageways being operable for supporting an attachment means, an elongated opening formed in said casing in communication with said other passageway, stop means normally extending into said other passageway for opposing movement of the attachment means therepast, and feeder means extending through said opening and operable responsive to relative movement of said casing and tool from one of said positions to the other independently of said stop means for ineffectuating the latter and forcing the attachment means therepast.

11. In a tool device, a casing formed with a pair of intercommunicated passageways, one of said passageways being operable for supporting a tool for rectilinear movement relatively thereto between a pair of limit positions, the other of said passageways being operable for supporting an attachment means, an elongated opening formed in said casing in communication with said other passageway, resiliently supported stop means normally extending into said other passageway ahead of the attachment means therein for opposing movement of the latter therepast from said other passageway into said one passageway, and feeder means extending through said opening and operable responsive to relative movement of said casing and tool from one of said positions to the other independently of said stop means for overcoming the resiliency of the latter and forcing the attachment means therepast.

12. In a tool device, a casing formed with a pair of intercommunicated passageways, one of said passageways being operable for supporting a tool for rectilinear movement relatively thereto between a pair of limit positions, the other of said passageways being operable for supporting a fastening means, stop means normally positioned forwardly of the fastening means for opposing movement of the latter therepast into said one passageway, lever means movable into a position rearwardly of the fastening means during and responsive to movement of said tool from one of said limit positions to the other and into a position forwardly of said first lever position during and responsive to movement of said tool from said other limit position to said one limit position, and feeder means carried by said lever means for movement therewith and cooperable with the fastening means during movement of said lever means from said first lever position to said second lever position for forcing the attachment means past said stop means into said one passageway ahead of said tool.

13. In a tool device, a casing formed with a pair of intercommunicated passageways, one of said passageways being operable for supporting a tool for rectilinear movement relatively thereto between a pair of limit positions, the other of said passageways being operable for supporting a fastening means, stop means normally positioned forwardly of the fastening means for opposing movement of the latter therepast into said one passageway, lever means movable into a position rearwardly of the fastening means during and responsive to movement of said tool from one of said limit positions to the other and into a position forwardly of said first lever position during and responsive to movement of said tool from said other limit position to said one limit position, an opening formed in said casing opposite said other passageway and extending therealong, and feeder means carried by said lever means for movement therewith and extending through said opening for cooperation with the fastening means during movement of said lever means from said first lever position to said second lever position to force the attachment means past said stop means into said one passageway ahead of said tool.

14. In a tool device, a casing formed with a pair of intercommunicated passageways, one of said passageways being operable for supporting a tool for rectilinear movement relatively thereto between a pair of limit positions, the other of said passageways being operable for supporting a fastening means, stop means normally positioned forwardly of the fastening means for opposing movement of the latter therepast into said one passageway, lever means movable into a position rearwardly of the fastening means during and responsive to movement of said tool from one of said limit positions to the other and into a position forwardly of said first lever position during and responsive to movement of said tool from said other limit position to said one limit position, an opening formed in said casing opposite said other passageway and extending therealong, and feeder means carried by said lever means for movement therewith and extending through said opening for cooperation with the fastening means during movement of said lever means from said first lever position to said second lever position to force the attachment means past said stop means into said one passageway ahead of said tool, said feeder means also being movable relatively to said lever means for permitting the former to follow said opening during movability thereof and of the former.

15. In a tool device, a casing having a pair of intercommunicated passageways, one of said passageways being operable for supporting a tool for rectilinear movement relatively thereto between a pair of limit positions, the other of said passageways being operable for supporting a fastening means, stop means normally extending into said other passageway ahead of the fastening means for opposing movement of the latter therepast into said one passageway, lever means pivotally carried by said casing and movable into an upper position with respect to said other passageway responsive to movement of said tool from one of said limit positions to the other and into a lower position with respect to said other passageway responsive to movement of said tool from said other limit position to said one limit position, feeder means carried by said lever means for movement therewith and operable during movement from said upper position to said lower position for extending into said other passageway and forcing the fastening means past said stop means into said one passageway and upon movement from said lower position into said upper position for being positioned externally of said other passageway, storage means for other fastening means, and means operable responsive to assumption by said feeder means of said upper position for controlling the discharge of the latter fastening means from said storage means into said other passageway.

16. In a tool device, a casing having a pair of intercommunicated passageways, one of said passageways being operable for supporting a tool for rectilinear movement relatively thereto between a pair of limit positions, the other of said passageways being operable for supporting a fastening means, stop means normally extending into said other passageway ahead of the fastening means for opposing movement of the latter therepast into said one passageway, lever means pivotally carried by said casing and movable into an upper position with respect to said other passageway responsive to movement of said tool from one of said limit positions to the other and into a lower position with respect to said other passageway responsive to movement of said tool from said other limit position to said one limit position, an opening formed in said casing in communication with and extending along said other passageway, feeder means carried by said lever means for movement therewith and operable during movement from said upper position to said lower position for extending through said opening and forcing the fastening means past said stop means into said one passageway and upon movement from said lower position into said upper position for being positioned externally of said opening, storage means for other fastening means, and means operable responsive to assumption by said feeder means of said upper position for controlling the discharge of the latter fastening means from said storage means into said other passageway.

WALTER BLAIR.